(12) United States Patent
Burke

(10) Patent No.: US 7,067,181 B2
(45) Date of Patent: Jun. 27, 2006

(54) INSULATING CERAMIC BASED ON PARTIALLY FILLED SHAPES

(75) Inventor: Michael Anthony Burke, Pittsburgh, PA (US)

(73) Assignee: Siemens Power Generation, Inc., Orlando, FL (US)

( * ) Notice: Subject to any disclaimer, the term of this patent is extended or adjusted under 35 U.S.C. 154(b) by 356 days.

(21) Appl. No.: 10/634,391

(22) Filed: Aug. 5, 2003

(65) Prior Publication Data

US 2005/0031846 A1  Feb. 10, 2005

(51) Int. Cl.
*B32B 23/00* (2006.01)

(52) U.S. Cl. ............ 428/34.4; 428/36.5; 428/332; 428/701; 428/702; 428/446; 428/402; 428/403

(58) Field of Classification Search ............ 428/34.4, 428/36.5, 332, 701–702, 446, 402–403
See application file for complete search history.

(56) References Cited

U.S. PATENT DOCUMENTS

| | | |
|---|---|---|
| 3,325,341 A | 6/1967 | Shannon |
| 4,035,545 A | 7/1977 | Ivanov et al. |
| 4,423,097 A | 12/1983 | Mons et al. |
| 4,450,184 A | 5/1984 | Longo et al. |
| 4,775,598 A | 10/1988 | Jaeckel |
| 5,002,904 A | 3/1991 | Jain et al. |
| 5,185,297 A * | 2/1993 | Park et al. ............ 501/80 |
| 5,780,146 A | 7/1998 | Mason et al. |
| 5,854,154 A | 12/1998 | Radford et al. |
| 5,985,368 A | 11/1999 | Sangeeta et al. |
| 6,013,592 A | 1/2000 | Merrill et al. |
| 6,197,424 B1 | 3/2001 | Morrison et al. |
| 6,235,370 B1 | 5/2001 | Merrill et al. |
| 6,287,511 B1 | 9/2001 | Merrill et al. |
| 6,514,046 B1 | 2/2003 | Morrison et al. |
| 6,528,190 B1 | 3/2003 | Campbell et al. |
| 2002/0168505 A1 | 11/2002 | Morrison et al. |
| 2003/0059577 A1 | 3/2003 | Morrison et al. |
| 2003/0080477 A1 | 5/2003 | Merrill et al. |

FOREIGN PATENT DOCUMENTS

WO  WO 03/026886 A2  4/2003

* cited by examiner

*Primary Examiner*—Ling Xu

(57) ABSTRACT

An insulating ceramic made up of a plurality of partially filled shapes (e.g., 101), such as oblate spheroids, spheres, and shapes free of corners, is provided. Each partially filled shape may include an inner skeleton (e.g., 102) and an outer skin (e.g., 104). The inner skeleton may be stabilized at a higher temperature relative to the outer skin. The shapes may be disposed in a binding matrix. The thickness of the outer skin may be very thin in view of the support provided by the inner skeleton, thereby improving the abradability characteristics of the ceramic.

23 Claims, 3 Drawing Sheets

INSULATING CERAMIC BASED ON PARTIALLY FILLED SHAPES

FIELD OF THE INVENTION

The present invention is generally related to high temperature ceramic insulating materials.

BACKGROUND OF THE INVENTION

Various insulating materials that may be used as coatings have been developed to strengthen the resistance of underlying substrates to increased temperatures. Thermal Barrier Coatings (TBCs) are commonly used to protect a machine's components from premature breakdown due to increased temperatures to which the components are exposed.

A possible issue in connection with TBCs may be a limitation in the thickness that can be used. This thickness limitation of approximately 0.5 mm may be due to manufacturing-induced residual stresses, prohibitive costs, required life of the TBC material, temperature limit of the TBC, and mismatches in the coefficients of thermal expansion of the TBC and the underlying substrates. In addition, the microstructure of standard TBCs (e.g., those that may be applied by air plasma spray and/or physical vapor deposition) may be dictated by process conditions, may be limited in versatility, and may be prone to dimensional and thermal instability at temperatures greater than 1000° C.

DETAILED DESCRIPTION OF THE INVENTION

Aspects of the present invention provide a composition that uses a high temperature ceramic material as an insulator over a higher strength, lower temperature substrate for application in high temperature environments. As described in U.S. Pat. No. 6,197,424, herein incorporated by reference in its entirety, the assignee of the present invention has developed an innovative ceramic insulation useful for the thermal protection of, for example, oxide-oxide ceramics and ceramic matrix composites. This insulation essentially comprises structures in which random "close-packed" arrays of integral solid walled hollow spheres may be contained within a relatively less stable, but process-compatible matrix.

The reliance of this ceramic on integral solid walled hollow spheres, although quite effective for its intended purposes, may give rise to some processing and performance characteristics that may not necessarily be optimal for every possible application. Firstly, this structure generally relies on unbroken hollow spheres to prevent matrix filling of the spheres during processing: the occurrence of such a filling would remove the thermally insulating air or void in the hollow sphere and replace it with more conductive solid material. Secondly, the local strength of the structure is generally provided by the load bearing capability of each hollow sphere and, hence, the thickness of the sphere wall. For achieving higher strength, a thicker wall would be required, but thicker walls would induce a higher solid to air/void ratio, thereby increasing the thermal conductivity and reducing the material's effectiveness as a thermal insulation. Indeed, as a corollary to thickness effects, the abradability of a hollow sphere may be inversely linked to the strength and stability of the structure since the thicker walls that would enhance the strength and stability of the structure would also degrade its abradability. In view of the foregoing considerations, aspects of the present invention provide an insulation material configured to provide extended thermal stability, increased strength, improved chemical stability and improved abradability.

Figure 1:
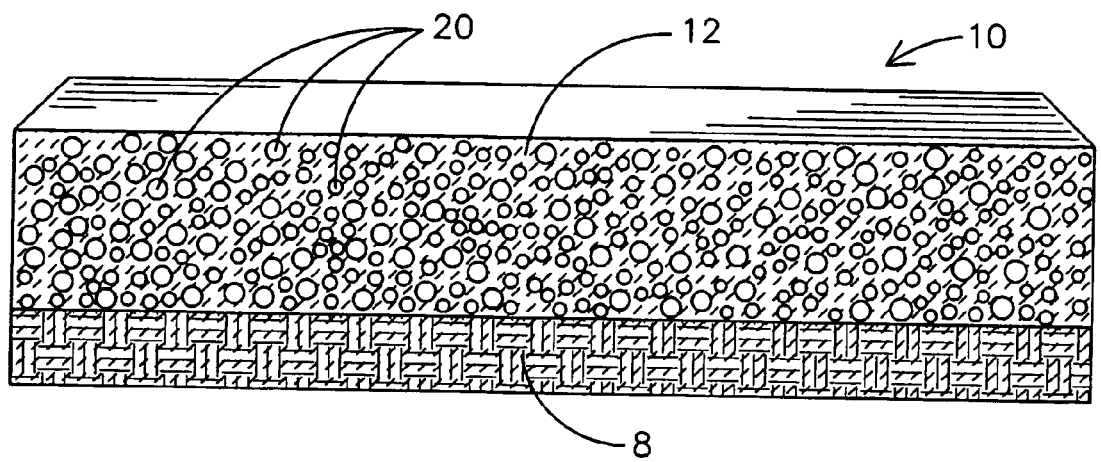
FIG. 1 shows a perspective view depicting a cross section of a prior art ceramic insulating composition.

Referring to the drawings, FIG. 1 shows a perspective view depicting a cross section of a prior art ceramic insulating composition 10. For facilitating understanding of the various aspects of the present invention, the description that follows first focuses on a ceramic insulation that up to the present invention has generally relied on hollow oxide-based spheres 20. The composition 10 may comprise a combination 12 of a binder and various oxide filler powders. The binder "bridges" the gaps between the spheres 20 and the oxide filler powders. The spheres 20 may be manufactured at sufficiently high temperatures to make them stable at temperatures in the order of 1600° C., depending on the particular constituents of the composition 10. Firing temperatures up to 1600° C., may be used to create the composition, which is dimensionally stable, chemically stable and erosion resistant.

Dimensional stability is primarily controlled by the properties of the spheres 20. The composition 10 achieves improved erosion resistance by introducing closed porosity on a macroscopic scale with a relatively dense arrangement of spheres 20. In one exemplary embodiment, the spheres 20 may be arranged so that each sphere is in contact with at least one other sphere 20. More specifically, the spheres 20 may be arranged so that each sphere is in contact with several other spheres 20, e.g., at least 3 or 4 spheres 20. This results in improved dimensional stability, especially at elevated temperatures near 1600° C. In one exemplary embodiment, composition 10 may be stable at temperatures greater than approximately 1300° C., and more specifically at temperatures up to approximately 1600° C.

Oxide filler powders in combination with the binder can be varied to control properties of the composition 10. Specific compositions may be formulated to cover a range of coefficients of thermal expansion (CTE). As will be understood by those skilled in the art, the CTE of the composition 10 should be as close as practically feasible to the CTE of the substrate 8 for the composition 10 to remain in place on the substrate 8. Various properties of exemplary compositions 10, A and B, are shown in Table 1.

TABLE 1

|  | Material | |
|---|---|---|
|  | A | B |
| Use Temp (° C.) | 1200 | 1600 |
| CTE (×10$^{-6}$ mm/mm° C.) | 5.85 | 5.85 |
| Thermal Conductivity (W/mK) at 1400° C. | 1.27 | 2.21 |
| Erosion Resistance* (g/kg) at 1100° C. | 7.5 | 4.5 |

*Tested at 15° C., impingement angle, 900 ft/s erodent speed.

Material properties such as thermal conductivity and erosion resistance can be tailored by specific selection of filler materials or sphere compositions. The hollow oxide-based spheres 20 of the composition material can be made of either Mullite, Alumina, stabilized Zirconia (usually Yttria stabilized Zirconia) or any combination thereof. An exemplary range of diameters of the Mullite spheres is approximately 0.4 to approximately 1.8 mm, and more specifically approximately 0.8 to approximately 1.4 mm. An exemplary range of diameters of the Alumina spheres is approximately 0.3 to approximately 1 mm. An exemplary range of diameters of the stabilized Zirconia spheres is approximately 0.6 to approximately 1.2 mm, and more specifically approximately 0.8 to approximately 1 mm.

When only Mullite spheres are used, e.g., KCM Holospheres RTM manufactured by Keith Ceramics, Inc. of Great Britain, an exemplary weight percentage of spheres 20 in the composition 10 is 32%±10%, more specifically 32%±5%, and even more specifically approximately 32%. When only Alumina spheres are used, i.e., manufactured by Ceramic Fillers, Inc. of Atlanta, Ga., an exemplary weight percentage of spheres 20 in the composition 10 is 63%±15%, more specifically 63%±10%, still more specifically 63%±5%, and even more specifically approximately 63%. When only stabilized Zirconia spheres are used, e.g., manufactured by Keith Ceramics, Inc., an exemplary weight percentage of spheres 20 in the composition 10 is 58%±15%, more specifically 58%±10%, still more specifically 58%±5%, and even more specifically approximately 58%.

To tailor a particular composition to obtain a particular CTE to "match" the CTE of the intended substrate 8, one may vary the combination of spheres 20. For example, monolithic stabilized Zirconia spheres have the highest CTE (approximately 10×10$^{-6}$ mm/mm° C.), monolithic Mullite spheres have the lowest (approximately 5.7×10$^{-6}$ mm/mm° C.), and monolithic Alumina spheres have an intermediate value (approximately 8.0×10$^{-6}$ mm/mm° C.).

An exemplary combination of spheres 20 is 20% Mullite and 80% Alumina by volume. As displayed in Table 2, this sphere composition yields a % linear change of 0.5972, which "matches" a value of 0.5934 for Composite A (an oxide-based CMC material) and a value of 0.6031 for composite B. For Composite C (a high silica containing oxide-based composite material), an all mullite sphere composition may be preferred in one exemplary embodiment.

TABLE 2

| Sphere Composition | Volumetric Ratio | % Linear Change at 1000° C. | Oxide/Oxide Substrate Composition (% Linear Change at 1000° C.) |
|---|---|---|---|
| Mullite | 100 | 0.5657 | 0.5631 (C) |
| Mullite and Stabilized Zirconia | 50/50 | 0.5660 | |
| Mullite and Alumina | 50/50 | 0.5763 | |
| Mullite and Alumina | 20/80 | 0.5972 | 0.5934 (A) and 0.6031 (B) |
| Mullite and Alumina | 10/90 | 0.6210 | |
| Mullite and Alumina | 5/95 | 0.6337 | |
| Alumina | 100 | 0.6380 | |
| Stabilized Zirconia | 100 | 0.7325 | |

The oxide filler powders can be Alumina, Mullite, Ceria, Hafnia or any combination thereof. In one exemplary embodiment, Alumina or Mullite is used as the filler powder, and more specifically, Mullite is used because of its superior high temperature properties. In one exemplary embodiment, when Mullite is used, the weight percentage of the oxide filler powder in the composition 10 is 32%±10%±15%, more specifically 32%±10%, still more specifically 32%±5%, and even more specifically approximately 32%. The exemplary weight percentages of the oxide filler powders vary because of the different atomic mass and particle size of each.

In one exemplary embodiment, the binder is Aluminum Ortho-Phosphate in a weight percentage of 31%±15%, more specifically 31%±10%, still more specifically 31%±5%, and even more specifically approximately 31%. In one exemplary embodiment, a combination of Aluminum Ortho-Phosphate binder and Mullite filler powder has a viscosity of approximately 9,000 centipoise, measured with a Brookfield.RTM RV viscometer having a spindle No. of 7 and a rpm of 20.

The manufacturing process for the composition 10 may comprise the following steps: (1) mixing a slurry, (2) casting the slurry, (3) controlled drying, (4) removal of the "green" body, (5) firing, and (6) machining. The mixture is formulated such that the end product possesses a CTE practically identical to that of the CMC substrate 8.

The process starts with the mixing of raw materials to form a viscous slurry and is accomplished in two stages. First, Aluminum Ortho-Phosphate and the filler powder is mixed to an exact formulation of 50% aqueous solution of Aluminum Ortho-Phosphate and is stored air-tight (with a shelf life of up to 2 months). Alternatively, one can start with a 50% aqueous solution of Aluminum Ortho-Phosphate.

When a casting is performed, approximately equal amounts of hollow spheres 20 are added to the slurry and the slurry mixture is then cast within approximately 24 hours of being made. The slurry containing the hollow spheres 20 is cast into presoaked molds. The molds are presoaked with deionized water prior to casting to allow the capillary drying of the casting to be effective. If the slurry was cast into a dry mold, water from the cast would be extracted too quickly into the mold creating a dry surface on the casting preventing further controlled drying from occurring. This would result in an non-homogenous end product. At some stage in the drying of the castings, the viscosity is sufficiently high for the "green" bodies to be extracted from the molds with minimal dimensional distortion ("green" body is the term used for the composition prior to firing).

After removal from the mold, the "green" bodies are transferred to a drying oven (at approximately 80° C.). In one exemplary procedure, before drying, the "green" bodies are shaped to conform to the contour of a mating substrate surface. This step will achieve near net shaping capability. After drying, the "green" bodies are then transferred to the firing oven. During firing, a slow heating rate is used with a dwell at approximately 250° C., which ensures that substantially all of the free water is removed by this stage.

Between approximately 250° C., and approximately 565° C., steady dehydration of the phosphate commences and this is controlled by a slow heating rate through this temperature range. The rest of the firing cycle is dedicated to chemical changes in the phosphate structure. An incorrect procedure for removing water from this material may result in a defective and weak microstructure.

The molds are recycled after the "green" bodies have been removed. This is achieved by washing out the leached phosphate with running water followed by oven drying. When fully dry, the dry weight of the mold should be within approximately 1% of the original dry weight in order for the mold to be used again. It may be expected to reuse a mold up to 12 times.

In preparation for firing, the "green" bodies can be stacked to minimize furnace space. The resulting simplified firing cycle is shown in Table 3.

TABLE 3

| Step Number | Start Temp (° C.) | Ramp Rate (° C./min.) | Hold Temp (° C.) | Dwell Time (mins.) |
| --- | --- | --- | --- | --- |
| 1 | 80 | 1 | 250 | 60 |
| 2 | 250 | 3 | 1600 | 240 |
| 3 | 1600 | 10 | ambient | END |

The final phase of the manufacturing process is to machine the insulating composition 10.

This manufacturing process allows molds to be reused by virtue of the removal of green bodies at a low temperature stage. This process yields the following benefits: the reduction of both raw materials and machining, reduced waste, more flexibility in the manufacturing process, "green" pre-forms can be bonded together to make more complex shapes and/or the attachment of different compositions, the reduction of capital equipment, a reduction in furnace space for firing by prior removal of mold material results in smaller furnaces with less costly initial outlays and running costs, reduction of manufacturing cycle time, removal of "green" bodies from the molds allows recasting to be concurrent with firing and removes the need for labor intensive breakout of fired casts from spent molds, and simplified firing cycle makes processing easier to duplicate.

At temperatures up to approximately 750° C., the binder may exist in a glassy form, which is compliant during the firing process. This may provide the potential for shape forming during the first firing. By firing the material up to temperatures of approximately 1200° C., a "bridge" (e.g., a phosphate bridge) is produced that gives a compliant matrix that can be used as a displacement type abradable seal.

By heat treating further to approximately 1600° C., the "bridge" network that connects the constituents of the material system (e.g., the particles and spheres) is significantly modified to form more localized and densified phosphate agglomerations within the microstructure. A material system with new properties results from this change that retains up to 80% of its room temperature strength at 1400° C., has similar thermal conductivity and excellent erosion resistance (approximately a factor of 2 times better than presently available TBC systems used on metallic substrates).

The material is fired stand alone and then ground to shape prior to bonding to the substrate 8. The adhesive 9 may vary according to the substrate 8. Direct coating onto the substrate 8, however, is also possible utilizing the substrate 8 and/or in-situ curing in the application environment. Potential applications for the ceramic insulating composition 10 are vast. Such applications would include, but not limited to, high heat flux environments such as those occurring in gas turbine hot section components or re-entry vehicle surfaces. These coatings can be applied to a wide variety of substrate materials including, but not limited to, oxide matrix composites (e.g., Mullite, Aluminosilicate and Alumina), Silicon Carbide matrix composites (made by techniques such as Chemical Vapor Infiltration or melt-infiltration), Silicon Nitride matrix composites (made by means such as reaction bonding, nitriding, hot pressing or pressureless sintering).

Application of the composition 10 may be performed by forming the composition 10 separately and subsequently bonding the composition 10 to the substrate 8 using Aluminum Phosphate-based adhesives (or other ceramic-based adhesive systems) cured at intermediate temperatures, i.e., around 800° C. through 1000° C. Coatings of mullite or alumina may be applied to the substrate 8 prior to bonding to prevent fiber damage during curing and/or to facilitate bonding. These coatings may be especially desirable when bonding to non-oxide substrates 8.

The description that follows focuses on the aspects of the present invention that allow use of partially filled spheres in lieu of hollow spheres described above and in the prior art. In this modification, spheres that comprise an interior skeletal structure and an outer skin substitute the stabilized hollow spheres for the thermally insulating composition. The low thermal conductivity of the structure is maintained by making the interior of the structure of relatively low spatial fill. In one exemplary embodiment, the fill material volume may be in the range from about 5% to 40% of the inner sphere volume (i.e., volume defined by the inside surface of the outer skin), with a preferred range from about 15% to about 20%. These ranges may be based on the ability of a skeletal structure formed around an array of close-packed shapes to support a framework. It will be appreciated that shapes contemplated by the present invention need not be limited to spheres since other shapes, such as oblate spheroids, or any other shape generally void of corners may work equally effective. Accordingly, although the present description may make reference to spheres, such terminology should be construed as exemplary and not as limiting terminology.

The thermal stability of the spheres, and hence that of the overall structure may be maintained by having the interior skeleton and/or the outside skin thermally stabilized. The structure thus behaves under high temperatures in the same advantageous manner as the structure based on hollow spheres, allowing for matrix densification and local shrinkage but maintaining the macroscopic dimensions by virtue of the contiguous array of stable spheres when such dimensional stability is desired.

Figure 5:
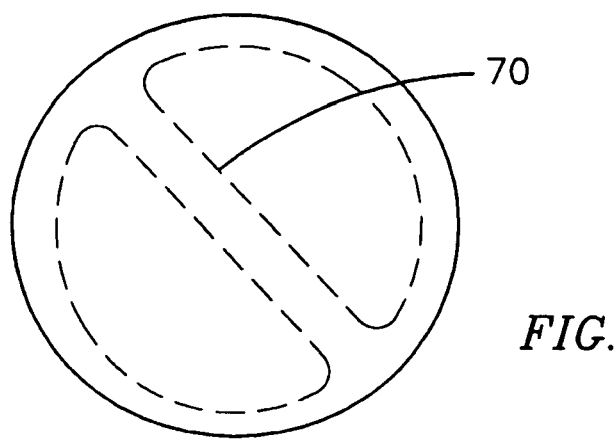
FIGS. 5–7 respectively illustrate exemplary configurations of an inner skeleton for the partially filled spheres.
Figure 6:
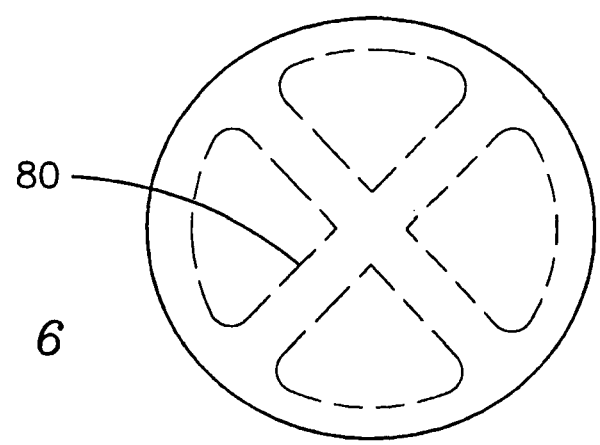
Figure 7:
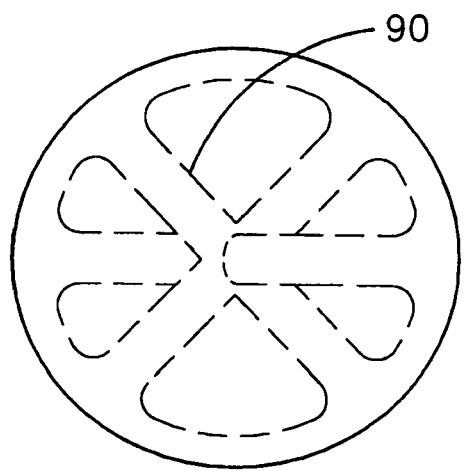

The present inventors have innovatively recognized that partially filled spheres enable thin (potentially very thin) walled spheres supported by the internal skeletal structure (e.g., a 3-D skeletal structure having varying degrees of porosity, as an open foam, sponge-like structure, or a coral reef structure may respectively have) as the basis for the ceramic thermal insulation. In one exemplary embodiment, the partially filled spheres may be made from materials as those that are employed for hollow spheres and would similarly provide the thermal stability of the insulating composition by pre-firing the spheres at temperatures that are relatively higher than the temperatures the insulation is likely to experience during its operation. It will be appreciated that the internal structure need not be a 3-D skeletal structure. For example, it is contemplated such inner structure may be constructed as a shaft 70 extending through the center of the sphere as shown in FIG. 5, or as a cruciform 80 shown in FIG. 6, or as an structure comprising multiple fingers extending through the interior of the sphere as shown in FIG. 7. This last structure may be conceptually analogized to the individual jack pieces (each with multi-branches) for playing the game of jacks.

In a composition comprising partially filled spheres, both the skin and the internal skeleton (but primarily the internal skeleton) may stabilize the structure of each sphere. The outer skin can therefore be much thinner than the skin required for a similar sized hollow sphere. In one exemplary embodiment the thickness of the outer skin of the sphere may range from about 0.1 mm to about 5 mm, with a preferred range from about 0.3 mm to about 1.5 mm. In one exemplary embodiment, the sphere wall thickness may be in the range from about 1% to about 30% of the sphere diameter with a preferred range from about 5% to about 10% of the sphere diameter. This range may vary based on obtaining an appropriate volume of free space to contribute to the thermal insulation properties of the insulating structure.

Figure 2:
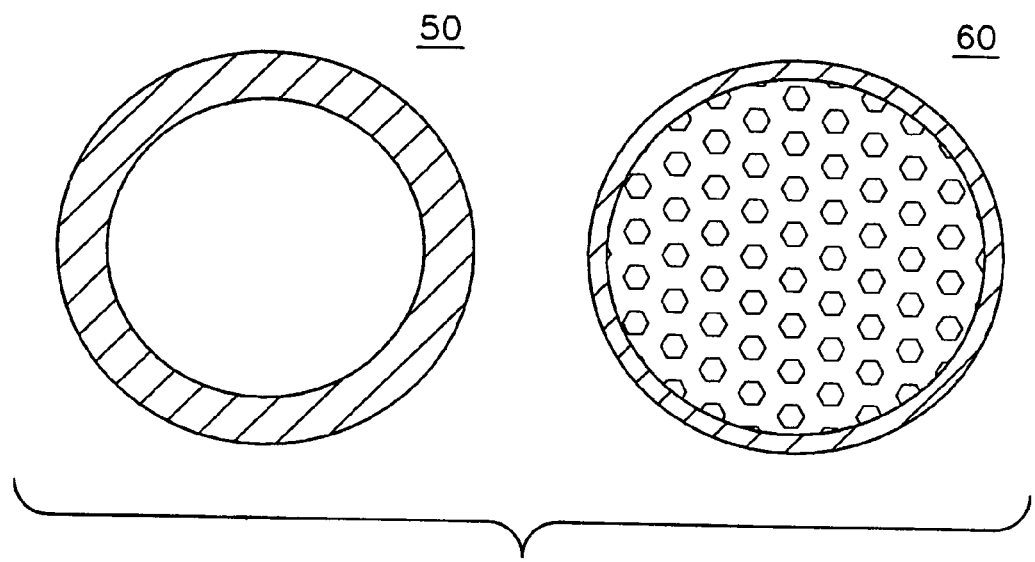
FIG. 2 comparatively illustrates some structural differences between an exemplary hollow sphere and an exemplary partially filled sphere.

Because each skeleton-stabilized sphere comprises a relatively low-density material, the resulting structure is still essentially a low thermal conductivity material that can be advantageously employed to fabricate an insulating structure. FIG. 2 comparatively illustrates some structural differences between an exemplary hollow sphere 50 and an exemplary partially filled sphere 60.

In one exemplary embodiment, the materials for constructing the partially filled spheres could be those that are traditionally utilized for the hollow spheres, e.g., alumina, mullite, etc. These materials may be fabricated as a foam-like inner structure and then a second material may be applied as the outer layer. One advantageous aspect of the present invention is the fact that the partially filled spheres may be also constructed out of materials that could be difficult to process for constructing a hollow sphere. For example, one could experience difficulty processing a particular material as a hollow sphere. However, in the case of the partially filled sphere, one may readily coat that material over the skeleton to just construct the outer layer.

Using this approach one could make the skeleton using any of the materials traditionally used for the hollow sphere, e.g., mullite, alumina, etc. One could then apply virtually any other desired material, such as any desired oxide, over the skeleton to construct the outer layer. That is, the universe of materials that one can use for constructing partially filled spheres may be substantially expanded compared to the choices that one has for hollow spheres because one can use the inner skeleton as the basis for applying an outer coating to form the partially-filled sphere.

Examples of other materials that may be used for constructing the inner skeleton may include silicon-based materials, such as silicon carbide, silicon nitride, etc. The increased usage of materials provides welcomed versatility to the designer since one may choose to include a given material to more precisely control certain properties of the insulating material, such as thermal conductivity, thermal expansion, etc.

It will be understood that other materials that are available as foamed systems may be employed equally effective: for instance the hollow structure "Flyash" waste from power plants may provide a very cost effective skeletal structure. In any of these cases, the partially filled shapes would exhibit the same advantageous properties as those achievable with hollow spheres plus its own unique advantages. For example, as the wall thickness of the partially filled spheres may be adjusted (thinned) due to the strengthening imparted by the interior skeleton, the local strength of the sphere wall against point forces may be decreased and the local "crushability" of the partially filled spheres may be increased. Incorporation of such spheres in a thermally insulating material would therefore be expected to provide a material with increased abradability, which may be desirable for certain applications.

By employing an inner, albeit open, structure and a sealing skin to the spheres, enhanced versatility in the processing of the thermally insulating material may be achieved. For example, if the inner skeletal structure is stabilized relative to thermal effects, the outer skin need not be as stable against such thermal effects. The outer skin may be allowed to sinter slightly thereby allowing densification of the thermally insulating structure. This capability could be employed during processing wherein the skin of the structure would be essentially moldable and during processing would conform relative to any adjacent spheres, as explained in greater detail in the context of FIG. 4. Such a structure would be amenable to pressure assisted sintering, hot pressing and other similar fabrication processes, thereby broadening the processability of the thermally insulating material.

Figure 3:
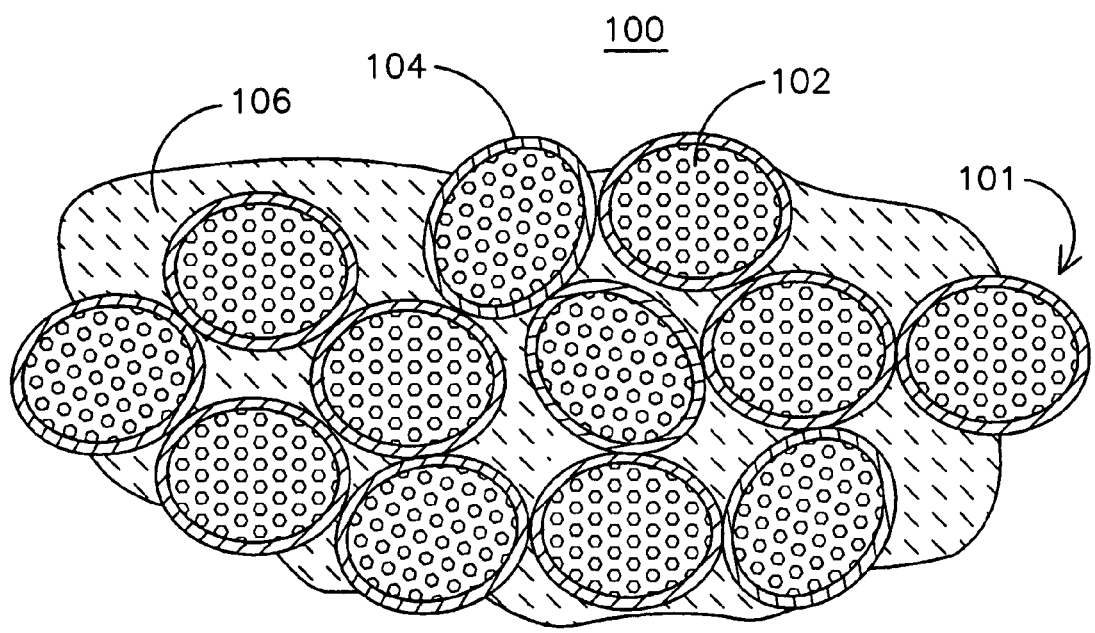
FIG. 3 illustrates one exemplary embodiment of an insulating system wherein each partially filled sphere exhibits a distinct boundary between the outer skin of the sphere and a binding matrix for the spheres.
Figure 4:
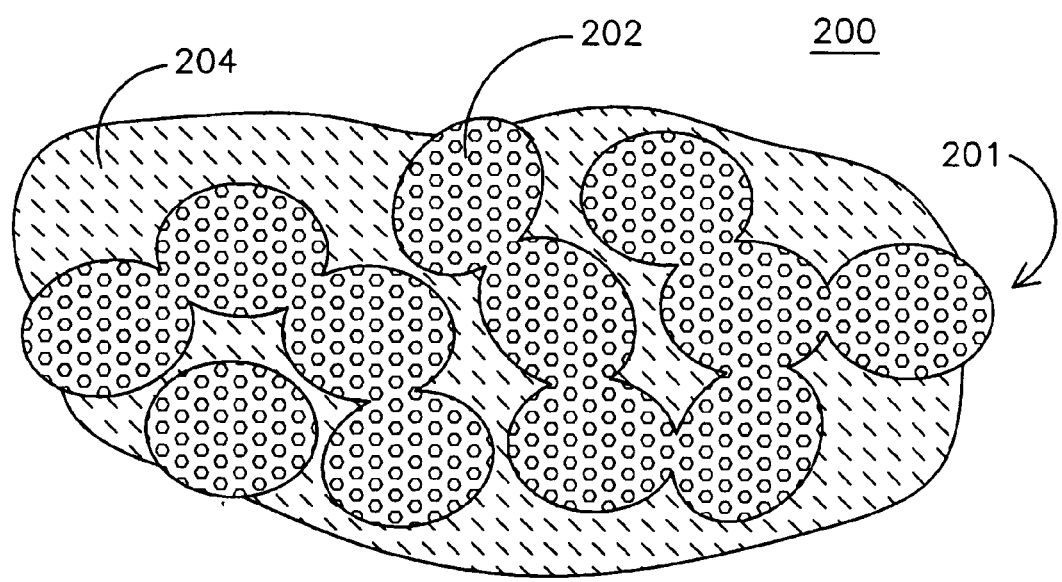
FIG. 4 illustrates another exemplary embodiment of an insulating system where there is absent a distinct boundary between the sphere skin and the binding matrix since the sphere skin also comprises the binding matrix.

FIG. 3 illustrates an exemplary embodiment of an insulating system 100 wherein each partially filled shape 101 comprises a skeleton 102, e.g., made up of material A, an outer coating 104, e.g., made up of material B. Materials A and B may be the same or different materials. System 100 further comprises a binding matrix 106, e.g., made up of material C. In this embodiment, material C would be poured to fill in the interstices between the spheres. In FIG. 4, an insulating system 200 is shown wherein each partially filled shape 201 once again comprises an skeleton 202, e.g., made up of material A, an outer coating 204, e.g., made up of material B. In this embodiment, it is contemplated that material B can flow and change its shape. For example, material B would cling to the skeleton and when one compresses material B, e.g., under high temperature, the coating would start to flow and fill in the interstices. In this embodiment, the same material that makes up the outer coating of the sphere may also make up the binding matrix. In this embodiment, there is no longer a distinct boundary between the sphere skin and the binding matrix since the sphere skin effectively comprises the binding matrix as well.

Another advantageous characteristic of partially filled shapes is that when one constructs the outer skin around the internal skeleton, one may maintain the basic skeleton shape, e.g., a spheroid, but may be a squashable spheroid. One may sufficiently displace the outer skin so that it allows pushing the spheroid into regions of the matrix that otherwise would comprise a void. One of the issues that one faces when packing an array of spheroids together is reducing voids between the spheroids. For example, the closest packing one may get in practical embodiments with hollow spheres is three spheres touching one another in a common plane, and an additional sphere stacked on an upper plane. Between these planes, there is typically an open space where one has to introduce material to fill such an open space. In one exemplary embodiment of the present invention, that space may be about 27 volume percent of the rest of the array. In one exemplary embodiment, the moldable surfaces of each respective one of the four adjacent partially filled spheres would be sufficiently squashy that one may push the spheroids into one another and their skin material would be moldable to at least partially fill the space that would otherwise result. That is, one would be basically keeping the spheroid shape, however, one would be sufficiently deforming the outer skin to at least partially close the void that would otherwise result.

In yet another aspect of the present invention, the potential for more broadly varying the engineering properties of the insulating system is presented. For example, in hollow spheres, the sphere material determines both the physical and chemical properties of the spheres, and, hence, the insulating structure. By providing a structural inner skeleton to control the physical and mechanical properties and an outer skin to protect the skeleton from the environment it would be possible to decouple the physical and mechanical behaviors of the spheres from the chemical and environmental behaviors. It might be possible for instance to use skeletal materials that are incompatible with the binding matrix and its processing by having an intermediate skin material providing a hermetic seal around the particles.

For various reasons, such as facilitating rapid reaction during processing, one may want to include a material in the interior of the sphere that could be chemically incompatible with the binding matrix material. In this case, the outer layer may provide an encapsulation function so that it isolates the inner material of the sphere from the binding matrix.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

I claim as my invention:

1. An insulating ceramic comprising a plurality of partially filled three dimensional shapes having an outer skin that encapsulates the shapes disposed in a binding matrix.

2. The insulating ceramic of claim 1 wherein the plurality of partially filled shapes comprises a dimensionally stabilized array of shapes.

3. The insulating ceramic of claim 1 wherein the plurality of partially filled shapes comprises shapes selected from the group consisting of oblate spheroid shapes, spheres, and shapes free of corners.

4. The insulating ceramic of claim 1 wherein each partially filled shape comprises an inner skeleton and the outer skin.

5. The insulating ceramic of claim 4 wherein the outer skin of the shape ranges from about 0.3 mm to about 1.5 mm in thickness.

6. The insulating ceramic of claim 4 wherein the inner skeleton comprises a structure selected from the group consisting of a shaft, a cruciform and a jack-like structure.

7. The insulating ceramic of claim 4 wherein the inner skeleton comprises a foam material.

8. The insulating ceramic of claim 4 wherein the outer skin and inner skeleton comprise an alumina based material.

9. The insulating ceramic of claim 4 wherein the outer skin and inner skeleton comprise an aluminosilicate material.

10. The insulating ceramic of claim 4 wherein the outer skin and inner skeleton comprise distinct materials.

11. The insulating ceramic of claim 4 wherein the inner skeleton comprises a silicon based material.

12. The insulating ceramic of claim 4 wherein the inner skeleton is stabilized at a higher temperature relative to the outer skin.

13. The insulating ceramic of claim 4 wherein the inner skeleton comprises flyash.

14. The insulating ceramic of claim 4 wherein the outer skin comprises a different material than the binding matrix.

15. The insulating ceramic of claim 4 wherein the outer skin of the plurality of partially filled shapes comprises the binding matrix.

16. The insulation ceramic of claim 4 wherein the outer skin comprises an encapsulation for the inner skeleton thereby providing environmental and/or chemical protection to the inner skeleton.

17. The insulating ceramic of claim 4 wherein inner skeleton fill material volume is in the range from about 5% to about 40% of the volume defined by the outer skin.

18. The insulating ceramic of claim 17, wherein inner skeleton fill material volume is in the range from about 15% to about 20% of the volume defined by the outer skin.

19. The insulating ceramic of claim 4 wherein the plurality of partially filled shapes comprises a plurality of spheroids, and wherein the outer skin thickness is in the range from about 1% to about 30% of the sphere diameter.

20. The insulating ceramic of claim 19, wherein the outer skin thickness is in the range from about 5% to about 10% of the spheroid diameter.

21. An insulating ceramic comprising a plurality of partially filled shapes disposed in a binding matrix, wherein each partially filled shape comprises an inner skeleton and an outer skin, and wherein the outer skin of the shape ranges from about 0.1 mm to about 5 mm in thickness.

22. An insulating ceramic comprising a close-packed array of partially filled spheroids, wherein any spheroid is partially deformed to at least partially fill a void otherwise formed between adjacent spheroids.

23. The insulating ceramic of claim 22 wherein a total volume of voids filled by partially deformed spheroids comprises up to about 27% of the volume of the array.

* * * * *